United States Patent
Park et al.

(10) Patent No.: US 10,250,518 B2
(45) Date of Patent: Apr. 2, 2019

(54) APPARATUS AND METHOD FOR SCHEDULING PACKET IN COMMUNICATION SYSTEM

(71) Applicants: Samsung Electronics Co., Ltd., Gyeonggi-do (KR); Seoul National University R&DB Foundation, Seoul (KR)

(72) Inventors: Yong-Seok Park, Seoul (KR); Hee-Su Im, Seoul (KR); Soo-Young Jang, Gyeonggi-do (KR); Sae-Woong Bahk, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 81 days.

(21) Appl. No.: 15/275,286

(22) Filed: Sep. 23, 2016

(65) Prior Publication Data

US 2017/0093740 A1    Mar. 30, 2017

(30) Foreign Application Priority Data

Sep. 24, 2015   (KR) .................. 10-2015-0135773

(51) Int. Cl.
| | | |
|---|---|---|
| *H04L 12/28* | (2006.01) | |
| *H04L 12/863* | (2013.01) | |
| *H04L 12/865* | (2013.01) | |
| *H04L 12/875* | (2013.01) | |
| *H04L 12/927* | (2013.01) | |

(52) U.S. Cl.
CPC .......... *H04L 47/6255* (2013.01); *H04L 47/56* (2013.01); *H04L 47/6275* (2013.01); *H04L 47/803* (2013.01)

(58) Field of Classification Search
CPC .......... H04L 12/56; H04L 12/54; H04L 12/28
See application file for complete search history.

(56) References Cited

U.S. PATENT DOCUMENTS

| | | |
|---|---|---|
| 6,452,933 B1 | 9/2002 | Duffield et al. |
| 7,349,405 B2 | 3/2008 | Deforche |
| (Continued) | | |

OTHER PUBLICATIONS

Hari Balakrishnan, et al., "The Effects of Asymmetry on TCP Performance," in Proceedings of Mobicom, 1997, 20 pages.

(Continued)

*Primary Examiner* — Brandon M Renner (57) ABSTRACT

The present disclosure relates to a sensor network, machine type communication (MTC), machine-to-machine (M2M) communication, and technology for internet of things (IoT). The present disclosure may be applied to intelligent services based on the above technologies, such as smart home, smart building, smart city, smart car, connected car, health care, digital education, smart retail, security and safety services. A method for scheduling a packet in a communication node in a communication system is provided. The method includes detecting a parameter value of a parameter related to a delay characteristic that is related to at least one packet; comparing the detected parameter value and a preset threshold parameter value; determining a priority for the at least one packet based on the compared result; and transmitting the at least one packet corresponding to the determined priority.

4 Claims, 8 Drawing Sheets

(56) References Cited

U.S. PATENT DOCUMENTS

| | | | | |
|---|---|---|---|---|
| 8,385,210 | B1* | 2/2013 | Weill | H04L 47/56 370/233 |
| 2003/0169746 | A1* | 9/2003 | Kitazawa | H04L 47/10 370/395.42 |
| 2006/0182022 | A1* | 8/2006 | Abedi | H04W 72/1278 370/229 |
| 2008/0008203 | A1* | 1/2008 | Frankkila | H04L 47/2416 370/412 |
| 2010/0100645 | A1* | 4/2010 | Yamaguchi | G06F 3/0611 710/6 |
| 2011/0158248 | A1* | 6/2011 | Vorunganti | H04L 47/12 370/412 |
| 2015/0039790 | A1* | 2/2015 | Bonen | G06F 3/0653 710/57 |
| 2016/0057649 | A1* | 2/2016 | Kakadia | H04W 28/0236 370/235 |
| 2016/0065484 | A1* | 3/2016 | Suzuki | H04L 47/522 370/415 |
| 2016/0364484 | A1* | 12/2016 | Dong | G06F 17/30864 |
| 2017/0017398 | A1* | 1/2017 | Hall | G06F 3/0604 |
| 2017/0338998 | A1* | 11/2017 | Li | H04L 29/06911 |

OTHER PUBLICATIONS

Lampros Kalampoukas, et al., "Improving TCP Throughput over Two-Way Asymmetric Links: Analysis and Solutions," in Proceedings of SIGMETRICS, 1998, 28 pages.

Paul E. McKenney, "Stochastic Fairness Queueing," in Proceedings of INFOCOM, 1990, pp. 733-740.

Alan Demers, et al., "Analysis and Simulation of a Fair Queueing Algorithm," Internetworking: Research and Experience, vol. 1, pp. 3-26, 1990, 24 pages Sally Floyd, et al., "Link-sharing and Resource Management Models for Packet Networks," IEEE Transactions on Networking, vol. 3, No. 4, pp. 365-386, Aug. 1995, 22 pages.

* cited by examiner

APPARATUS AND METHOD FOR SCHEDULING PACKET IN COMMUNICATION SYSTEM

CROSS-REFERENCE TO RELATED APPLICATION(S) AND CLAIM OF PRIORITY

The present application is related to and claims the benefit under 35 U.S.C. § 119(a) of a Korean patent application filed in the Korean Intellectual Property Office on Sep. 24, 2015 assigned Serial No. 10-2015-0135773, the entire disclosure of which is incorporated herein by reference.

TECHNICAL FIELD

The present disclosure relates to an apparatus and method for scheduling a packet in a communication system, and more particularly, to an apparatus and method for scheduling a packet by considering a delay characteristic in a communication system.

BACKGROUND

The Internet, which is a human centered connectivity network where humans generate and consume information, is now evolving to the internet of things (IoT) where distributed entities, such as things, exchange and process information without human intervention. The internet of everything (IoE), which is a combination of the IoT technology and the big data processing technology through connection with a cloud server, has emerged.

As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched.

Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

The above information is presented as background information only to assist with an understanding of the present disclosure. No determination has been made, and no assertion is made, as to whether any of the above might be applicable as prior art with regard to the present disclosure.

SUMMARY

To address the above-discussed deficiencies, it is a primary object to provide, for use in an apparatus and method for scheduling a packet in a communication system.

Another aspect of the present disclosure is to propose an apparatus and method for scheduling a packet by considering a delay characteristic in a communication system.

Another aspect of the present disclosure is to propose an apparatus and method for scheduling a packet by considering a delay characteristic thereby enabling to decrease computing overhead in a communication system. Another aspect of the present disclosure is to propose an apparatus and method for scheduling a packet by considering a delay characteristic thereby enabling to decrease delay in a communication system. Another aspect of the present disclosure is to propose an apparatus and method for scheduling a packet by considering a delay characteristic thereby enabling to enhance QoE in a communication system.

In accordance with an aspect of the present disclosure, a method for scheduling a packet in a communication node in a communication system is provided. The method includes detecting a parameter value of a parameter related to a delay characteristic which is related to at least one packet; comparing the detected parameter value and a preset threshold parameter value; determining a priority for the at least one packet based on the compared result; and transmitting the at least one packet corresponding to the determined priority.

In accordance with another aspect of the present disclosure, a method for scheduling a packet in a communication node in a communication system is provided. The method includes detecting a parameter value of a parameter related to a delay characteristic for a packet; comparing the detected parameter value and a preset threshold parameter value; determining a priority for the packet based on the compared result; and transmitting the packet corresponding to the determined priority.

In accordance with another aspect of the present disclosure, a communication node in a communication system is provided. The communication node includes a controller configured to perform an operation of detecting a parameter value of a parameter related to a delay characteristic which is related to at least one packet, an operation of comparing the detected parameter value and a preset threshold parameter value, and an operation of determining a priority for the at least one packet based on the compared result; and a transmitter configured to transmit the at least one packet corresponding to the determined priority.

In accordance with another aspect of the present disclosure, a communication node in a communication system is provided. The communication node includes a controller configured to perform an operation of detecting a parameter value of a parameter related to a delay characteristic for a packet, an operation of comparing the detected parameter value and a preset threshold parameter value, and an operation of determining a priority for the packet based on the compared result; and a transmitter configured to transmit the packet corresponding to the determined priority.

Other aspects, advantages, and salient features of the disclosure will become apparent to those skilled in the art from the following detailed description, which, taken in conjunction with the annexed drawings, discloses exemplary embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, it should be noted that like reference numbers are used to depict the same or similar elements, features, and structures.

DETAILED DESCRIPTION

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device or communication system. The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although ordinal numbers such as "first," "second," and so forth will be used to describe various components, those components are not limited herein. The terms are used only for distinguishing one component from another component. For example, a first component may be referred to as a second component and likewise, a second component may also be referred to as a first component, without departing from the teaching of the inventive concept. The term "and/or" used herein includes any and all combinations of one or more of the associated listed items.

The terminology used herein is for the purpose of describing various embodiments only and is not intended to be limiting. As used herein, the singular forms are intended to include the plural forms as well, unless the context clearly indicates otherwise. It will be further understood that the terms "comprises" and/or "has," when used in this specification, specify the presence of a stated feature, number, step, operation, component, element, or combination thereof, but do not preclude the presence or addition of one or more other features, numbers, steps, operations, components, elements, or combinations thereof.

The terms used herein, including technical and scientific terms, have the same meanings as terms that are generally understood by those skilled in the art, as long as the terms are not differently defined. It should be understood that terms defined in a generally-used dictionary have meanings coinciding with those of terms in the related technology.

In a communication system, packet scheduling is an important issue for enhancing performance of the communication system, so various schemes for scheduling a packet have been proposed in the communication system. Typical schemes among the various schemes for scheduling the packet include a priority based-packet scheduling scheme and a fairness based-packet scheduling scheme.

Firstly, the priority based-packet scheduling scheme will be described. The priority based-packet scheduling scheme is proposed for enhancing download performance in an environment that there are download traffic and upload traffic at the same time and a download bandwidth is different from a uplink bandwidth.

Generally, delay for download packets, such as a transmission control protocol (TCP) acknowledgement (ACK) packet, and the like due to upload packets stored at a uplink queue may be worsened due to a uplink bandwidth which is relatively narrow than a downlink bandwidth. So, the priority based-packet scheduling scheme proposes a transmission queue architecture including a plurality of transmission queues which independently manages a queue which stores download packets and a queue which stores upload packets in order to solve delay for the download packets, and may enhance download performance by setting a scheduling priority higher than a scheduling priority for a queue which stores upload packets for a queue which stores download packets. That is, the priority based-packet scheduling scheme enhances download performance by scheduling download packets before upload packets, such as by setting a priority higher than a priority for the upload packets for the download packets.

However, if there are a plurality of upload flows in a current communication system environment that delay-sensitive traffic, such as interactive traffic is significantly increased, such as a communication system environment that delay-sensitive traffic such as a mobile messenger, a mobile game, and the like is significantly increased, packets transmitted in the upload flows are processed after download packets due to the priority based-packet scheduling scheme even though the packets transmitted in the upload flows are delay-sensitive traffic.

So, if the priority based-packet scheduling scheme used, delay for the delay-sensitive traffic may occur. So, quality of experience (QoE) of a user may be significantly decreased due to the delay for the delay-sensitive traffic.

Secondly, the fairness based-packet scheduling scheme will be described below. The fairness based-packet scheduling scheme relatively fairly allocates a resource to each of a plurality of flows in an environment that there are the plurality of flows. For example, the fairness based-packet scheduling scheme may equally allocate a resource to each of the plurality of flows, or may allocate a resource to each of the plurality of flows based on a weight which is allocated to each of the plurality of flows. So, the fairness based-packet scheduling scheme may enhance QoE of a user by relatively fairly allocating a resource to each of a plurality of flows. However, as described above, if the fairness based-packet scheduling scheme is used in an environment that the plurality of flows occur, computing overhead may occur.

According to various embodiments of the present disclosure, an electronic device may include communication functionality. For example, an electronic device may be a smart phone, a tablet personal computer (PC), a mobile phone, a video phone, an e-book reader, a desktop PC, a laptop PC, a netbook PC, a personal digital assistant (PDA), a portable multimedia player (PMP), an mp3 player, a mobile medical device, a camera, a wearable device (such as a head-mounted device (HMD), electronic clothes, electronic braces, an electronic necklace, an electronic appcessory, an electronic tattoo, or a smart watch), and/or the like.

According to various embodiments of the present disclosure, an electronic device may be a smart home appliance with communication functionality. A smart home appliance may be, for example, a television, a digital video disk (DVD) player, an audio, a refrigerator, an air conditioner, a vacuum cleaner, an oven, a microwave oven, a washer, a dryer, an air purifier, a set-top box, a TV box (such as SAMSUNG HOMESYNC™, APPLE TV™, or GOOGLE TV™, a gaming console, an electronic dictionary, an electronic key, a camcorder, an electronic picture frame, and/or the like.

According to various embodiments of the present disclosure, an electronic device may be a medical device (such as magnetic resonance angiography (MRA) device, a magnetic resonance imaging (MRI) device, computed tomography (CT) device, an imaging device, or an ultrasonic device), a navigation device, a global positioning system (GPS) receiver, an event data recorder (EDR), a flight data recorder (FDR), an automotive infotainment device, a naval electronic device (such as naval navigation device, gyroscope, or compass), an avionic electronic device, a security device, an industrial or consumer robot, and/or the like.

According to various embodiments of the present disclosure, an electronic device may be furniture, part of a building/structure, an electronic board, electronic signature receiving device, a projector, various measuring devices (such as water, electricity, gas or electro-magnetic wave measuring devices), and/or the like that include communication functionality. According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

According to various embodiments of the present disclosure, for example, a communication node may be an electronic device. An embodiment of the present disclosure proposes an apparatus and method for scheduling a packet in a communication system. An embodiment of the present disclosure proposes an apparatus and method for scheduling a packet by considering a delay characteristic in a communication system. An embodiment of the present disclosure proposes an apparatus and method for scheduling a packet by considering a delay characteristic thereby enabling to decrease computing overhead in a communication system.

An embodiment of the present disclosure proposes an apparatus and method for scheduling a packet by considering a delay characteristic thereby enabling to decrease delay in a communication system. An embodiment of the present disclosure proposes an apparatus and method for scheduling a packet by considering a delay characteristic thereby enabling to enhance quality of experience (QoE) in a communication system.

A method and apparatus proposed in various embodiments of the present disclosure may be applied to various communication systems such as a long term evolution (LTE) mobile communication system, an LTE-advanced (LTE-A) mobile communication system, a licensed-assisted access (LAA)-LTE mobile communication system, a high speed downlink packet access (HSDPA) mobile communication system, a high speed uplink packet access (HSDPA) mobile communication system, a high rate packet data (HRPD) mobile communication system proposed in a 3rd generation project partnership 2 (3GPP2), a wideband code division multiple access (WCDMA) mobile communication system proposed in the 3GPP2, a code division multiple access (CDMA) mobile communication system proposed in the 3GPP2, an institute of electrical and electronics engineers (IEEE) 802.16m communication system, an IEEE 802.16e communication system, an evolved packet system (EPS), and a mobile internet protocol (Mobile IP) system and/or the like. An example of an inner structure of a communication node in a communication system according to an embodiment of the present disclosure will be described with reference to FIG. 1.

Figure 1:
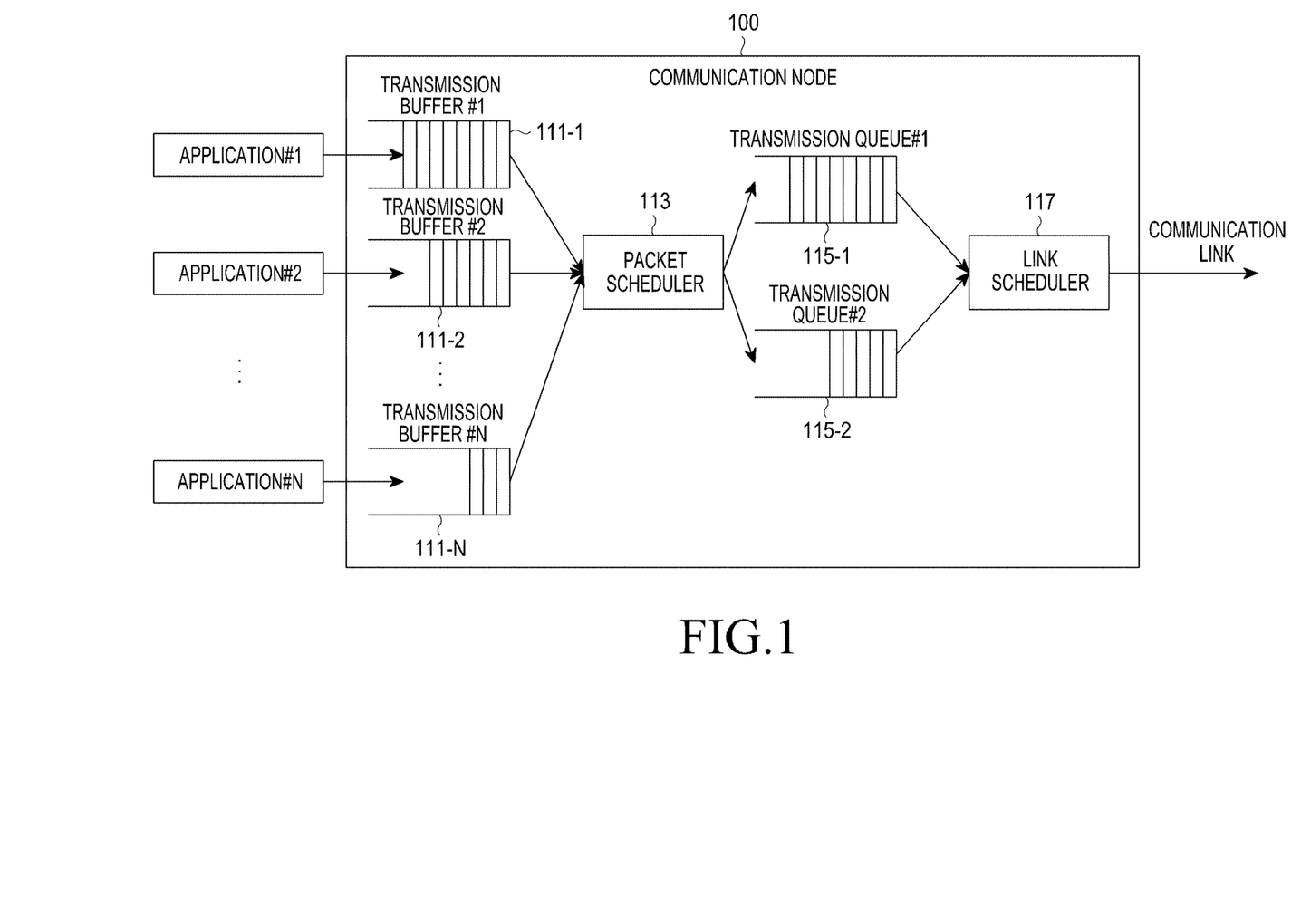
FIG. 1 schematically illustrates an example of an inner structure of a communication node in a communication system according to an embodiment of the present disclosure.

FIG. 1 schematically illustrates an example of an inner structure of a communication node in a communication system according to an embodiment of the present disclosure. Referring to FIG. 1, a communication node 100 includes a plurality of transmission buffers, such as N transmission buffers, such as a transmission buffer #1 111-1, a transmission buffer #2 111-2, . . . , a transmission buffer #N 111-N, a packet scheduler 113, a plurality of transmission queues, such as two transmission queues, such as a transmission queue #1 115-1 and a transmission queue #2 115-2, and a link scheduler 117. Each of the transmission buffer #1 111-1, the transmission buffer #2 111-2, . . . , the transmission buffer #N 111-N is mapped to a related application, and stores packets which occurs according to running of the related application.

The packet scheduler 113 performs a scheduling operation on packets which are stored at each of the transmission buffer #1 111-1, the transmission buffer #2 111-2, ..., the transmission buffer #N 111-N based on preset at least one parameter. The scheduling operation which the packet scheduler 113 performs based on the at least one parameter, such as a delay characteristic will be described below, so a detailed description will be omitted herein.

The packet scheduler 113 outputs packets of which a priority is higher than or equal to a preset threshold priority to the transmission queue #1 115-1, and packets of which a priority is lower than the threshold priority to the transmission queue #2 115-2 based on the scheduling operation result. The threshold priority will be described below, and a detailed description will be omitted herein. Only the packets of which the priority is higher than or equal to the threshold priority are stored at the transmission queue #1 115-1, and transmitted to other communication node through a communication link under a control of the link scheduler 117.

Only the packets of which the priority is lower than the threshold priority are stored at the transmission queue #2 115-2, and transmitted to other communication node through the communication link under a control of the link scheduler 117. A detailed description of a scheduling scheme of the link scheduler 117 will be omitted. While the transmission buffer #1 111-1, the transmission buffer #2 111-2, ..., the transmission buffer #N 111-N, the packet scheduler 113, the transmission queue #1 115-1 and the transmission queue #2 115-2, and the link scheduler 117 are described in the communication node 100 as separate units, it is to be understood that this is merely for convenience of description. In other words, two or more of the transmission buffer #1 111-1, the transmission buffer #2 111-2, ..., the transmission buffer #N 111-N, the packet scheduler 113, the transmission queue #1 115-1 and the transmission queue #2 115-2, and the link scheduler 117 may be incorporated into a single unit. The communication node 100 may be implemented with one processor.

An example of an inner structure of a communication node in a communication system according to an embodiment of the present disclosure has been described with reference to FIG. 1, and an example of an operating process of a communication node in a communication system according to an embodiment of the present disclosure will be described with reference to FIG. 2.

Figure 2:
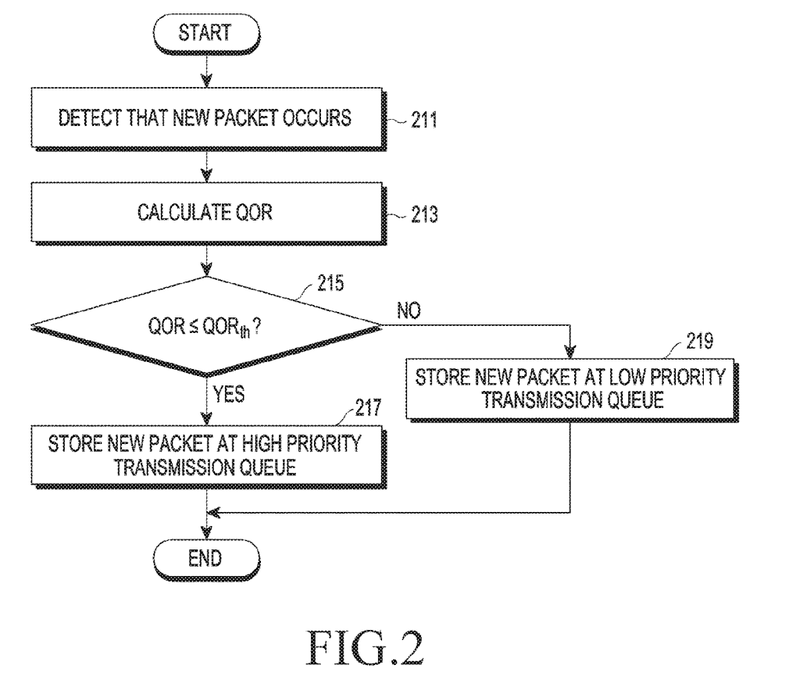
FIG. 2 schematically illustrates an example of an operating process of a communication node in a communication system according to an embodiment of the present disclosure.

FIG. 2 schematically illustrates an example of an operating process of a communication node in a communication system according to an embodiment of the present disclosure. Referring to FIG. 2, an embodiment of the present disclosure targets scheduling of packets based on a delay characteristic. For example, an embodiment of the present disclosure targets enhancement of performance for delay-sensitive traffic. So, as described in FIG. 1, an embodiment of the present disclosure proposes a packet scheduling scheme which is based on a transmission queue architecture including a plurality of transmission queues, such as a multi-transmission queue architecture.

For example, it will be assumed that a communication node, such as a smart phone runs an application on which delay-sensitive traffic occurs such as an application on which interactive traffic occurs, such as a mobile messenger, a mobile game, and the like and an application on which the delay-sensitive traffic does not occur such as an application on which delay-insensitive traffic occurs, such as a cloud storage service, and the like, at the same time. For convenience, an application on which delay-sensitive traffic occurs will be referred to as a delay-sensitive application, and an application on which delay-sensitive traffic does not occur, such as an application on which delay-insensitive traffic occurs will be referred to as a delay-insensitive application.

Like this, in a case that a delay-sensitive application and a delay-insensitive application are run at the same time, an embodiment of the present disclosure proposes a scheme of enhancing QoE of a user of a communication node by performing a scheduling operation thereby transmitting a packet which occurs in a delay-sensitive application before a packet which occurs in a delay-insensitive application.

So, an embodiment of the present disclosure proposes a scheduling operation of scheduling packets based on a queue occupancy ratio (QOR) thereby packets are scheduled by considering a delay characteristic. A packet scheduler included in a related communication node detects a QOR of each of transmission buffers included in the related communication node, and performs a scheduling operation based on the detected QORs. The QOR denotes a ratio by which packets which occurs on a related application occupies a transmission buffer which is mapped to the related application, and may be expressed as Equation (1).

$$QQR_s(t) = \frac{Q_s(t)}{sndbuf(t)} \quad \text{Equation (1)}$$

In Equation (1), s denotes an index indicating an application, Qs(t) denotes data amount of packets which are stored at a transmission buffer which is mapped to the application s, and sndbuf(t) denotes a size of a transmission buffer at time t.

As expressed in Equation (1), a QOR for a related application denotes a ratio of capacity of a transmission buffer which is mapped to the related application to data amount of packets which occur according to running of the related application and are stored at the transmission buffer. So, in an embodiment of the present disclosure, if the QOR is less than or equal to a preset threshold QOR QORth, a related application is determined as an delay-sensitive application, and if the QOR is greater than the QORth, a related application is determined a delay-insensitive application. The threshold QOR may be adaptively determined corresponding to a situation of the communication system.

Referring back to FIG. 2, a communication node detects that a new packet occurs on an application at operation 211. The communication node calculates a QOR of a transmission buffer which is mapped to the application on which the new packet occurs at operation 213. The communication node determines whether the calculated QOR is less than or equal to a threshold QOR QORth at operation 215. The threshold QOR is related to a threshold priority, and a priority of an application which is mapped to a transmission buffer which has a QOR which is less than or equal to the threshold QOR is higher than or equal to the threshold priority. Further, a priority of an application which is mapped to a transmission buffer which has a QOR which is greater than the threshold QOR is lower than the threshold priority. The threshold QOR will be described below, and a detailed description of the threshold QOR will be omitted herein.

If the calculated QOR is less than or equal to the threshold QOR, the communication node stores the new packet at a transmission queue at which packets of which a priority is higher than or equal to a threshold priority are stored, such as a high priority transmission queue at operation 217. If the calculated QOR is not less than or equal to the threshold QOR, that is, if the calculated QOR is greater than the threshold QOR, the communication node stores the new packet at a transmission queue at which packets of which a priority is lower than the threshold priority are stored, such as a low priority transmission queue at operation 219.

A scheduling operation in a case that a communication node includes two transmission queues has been described in FIG. 2, however, the communication node may include transmission queues of which the number is equal to the number of priorities which the communication node wants to operate. That is, if the communication node wants to operate N priorities, the communication node may include N transmission queues.

Although FIG. 2 illustrates an example of an operating process of a communication node in a communication system according to an embodiment of the present disclosure, various changes could be made to FIG. 2. For example, although shown as a series of operations, various operations in FIG. 2 could overlap, occur in parallel, occur in a different order, or occur multiple times.

An example of an operating process of a communication node in a communication system according to an embodiment of the present disclosure has been described with reference to FIG. 2, and another example of an operating process of a communication node in a communication system according to an embodiment of the present disclosure will be described with reference to FIG. 3.

Figure 3:
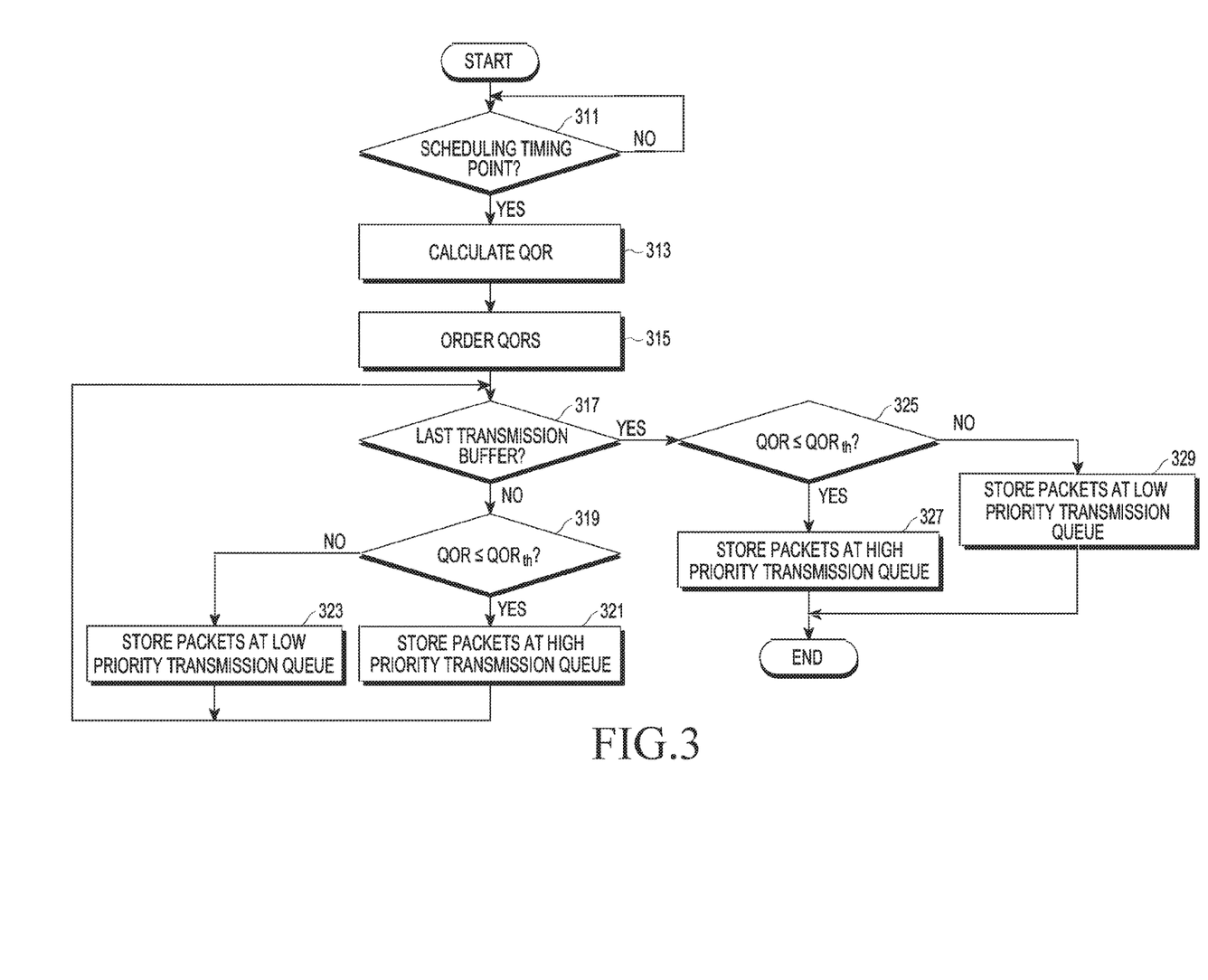
FIG. 3 schematically illustrates another example of an operating process of a communication node in a communication system according to an embodiment of the present disclosure.

FIG. 3 schematically illustrates another example of an operating process of a communication node in a communication system according to an embodiment of the present disclosure. Referring to FIG. 3, a communication node determines whether a related timing point is a scheduling timing point at operation 311. If the related timing point is the scheduling timing point, the communication node calculates a QOR of each of transmission buffers included in the communication node at operation 313. The communication node orders the calculated QORs in an order of small size at operation 315. The reason why the QORs are ordered in the order of small size is that the smaller a QOR is, the higher a probability that a related application becomes a delay-sensitive application is. The communication node performs the following operation on all transmission buffers from a transmission buffer which has the largest QOR in order.

The communication node determines whether a related transmission buffer is the last buffer among transmission buffers included in the communication node at operation 317. If the related transmission buffer is not the last buffer, the communication node determines whether a QOR of the related transmission buffer is less than or equal to a threshold QOR QORth at operation 319. If the QOR of the related transmission buffer is less than or equal to the threshold QOR, the communication node stores packets which are stored at the related transmission buffer at a transmission queue at which packets of which a priority is higher than or equal to a threshold priority are stored, such as a high priority queue at operation 321.

If the QOR of the related transmission buffer is not less than or equal to the threshold QOR, that is, if the QOR of the related transmission buffer is greater than the threshold QOR, the communication node stores packets which are stored at the related transmission buffer at a transmission queue at which packets of which a priority is less than the threshold priority are stored, such as a low priority queue at operation 323.

If the related transmission buffer is the last buffer, the communication node determines whether a QOR of the related transmission buffer is less than or equal to the threshold QOR at operation 325. If the QOR of the related transmission buffer is less than or equal to the threshold QOR, the communication node stores packets which are stored at the related transmission buffer at the high priority transmission queue at operation 327.

If the QOR of the related transmission buffer is not less than or equal to the threshold QOR, that is, if the QOR of the related transmission buffer is greater than the threshold QOR, the communication node stores packets which are stored at the related transmission buffer at a low priority transmission queue at operation 329. Comparing an operating process of a communication node in a communication system according to an embodiment of the present disclosure in FIG. 3 and an operating process of a communication node in a communication system according to an embodiment of the present disclosure in FIG. 2, it will be understood that scheduling timing points for packets stored at a transmission buffer are different. That is, in an operating process of a communication node in a communication system according to an embodiment of the present disclosure in FIG. 2, a scheduling operation is performed whenever a new packet occurs. However, in an operating process of a communication node in a communication system according to an embodiment of the present disclosure in FIG. 3, a scheduling operation is performed whenever it reaches a scheduling timing point.

In FIG. 3, a scheduling operation in a case that a communication node includes two transmission queues has been described, however, the communication node may include transmission queues of which the number is equal to the number of priorities which the communication node wants to operate. That is, if the communication node wants to operate N priorities, the communication node may include N transmission queues.

Although FIG. 3 illustrates another example of an operating process of a communication node in a communication system according to an embodiment of the present disclosure, various changes could be made to FIG. 3. For example, although shown as a series of operations, various operations in FIG. 3 could overlap, occur in parallel, occur in a different order, or occur multiple times. Another example of an operating process of a communication node in a communication system according to an embodiment of the present disclosure has been described with reference to FIG. 3, and an example of QOR distribution of applications in a communication system according to an embodiment of the present disclosure will be described with reference to FIG. 4.

Figure 4:
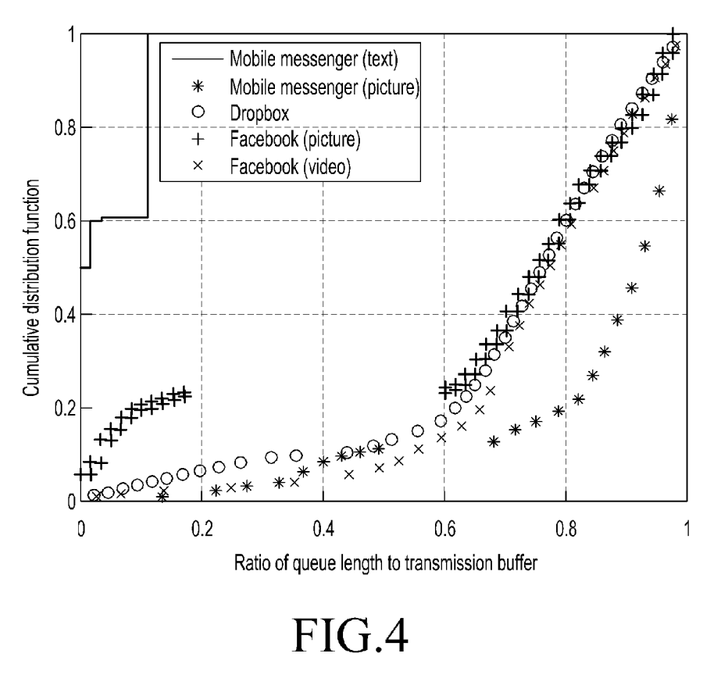
FIG. 4 schematically illustrates an example of QOR distribution of applications in a communication system according to an embodiment of the present disclosure.

FIG. 4 schematically illustrates an example of QOR distribution of applications in a communication system according to an embodiment of the present disclosure. Referring to FIG. 4, for example, QOR distribution of applications in FIG. 4 indicates QOR distribution of each of a mobile messenger in which a text is transmitted, a mobile messenger in which a picture is transmitted, a cloud storage service, a social network service (SNS) in which a picture is transmitted, and an SNS in which a video is transmitted. For example, it will be assumed that the cloud storage service is DROPBOX©, and the SNS is FACEBOOK©. The cloud storage service and the SNS are file transfer applications. In FIG. 4, it will be noted that a ratio of queue length to transmission buffer, such as a QOR of the mobile messenger in which the text is transmitted is illustrated as "Mobile messenger (text)", a QOR of the mobile messenger in which the picture is transmitted is illustrated as "Mobile messenger (picture)", a QOR is of DROPBOX© is illustrated as "Dropbox", a QOR is of FACEBOOK© in which the picture is transmitted is illustrated as "Facebook(picture)", and a QOR is of FACEBOOK© in which the video is transmitted is illustrated as "Facebook(video)".

In FIG. 4, a vertical axis indicates a cumulative distribution function, and a horizontal axis indicates a ratio of queue length to transmission buffer, such as a QOR.

As described in FIG. 4, it may be understood that a percentage for a case that it is greater than 50% of capacity of transmission buffers which are mapped to the file transfer applications is greater than or equal to 80% in file transfer applications such as a cloud storage service and an SNS unlike a mobile messenger. Specially, it may be understood that a related file transfer application always stores a packet at a transmission buffer until file transfer is completed.

So, an embodiment of the present disclosure proposes a scheduling scheme which is based on a QOR. That is, the scheduling scheme may provide a service which is differentiated based on a delay characteristic of each of applications by storing a packet of a related transmission buffer at a transmission queue at which packets with a high priority are stored if a QOR of a transmission buffer which is mapped to a related application is less than or equal to a threshold QOR, and storing a packet of a related transmission buffer at a transmission queue at which packets with a low priority are stored if the QOR of the transmission buffer which is mapped to the related application is greater than the threshold QOR.

An example of QOR distribution of applications in a communication system according to an embodiment of the present disclosure has been described with reference to FIG. 4, and delay performance of a mobile messenger in a communication system according to an embodiment of the present disclosure will be described with reference to FIG. 5.

Figure 5:
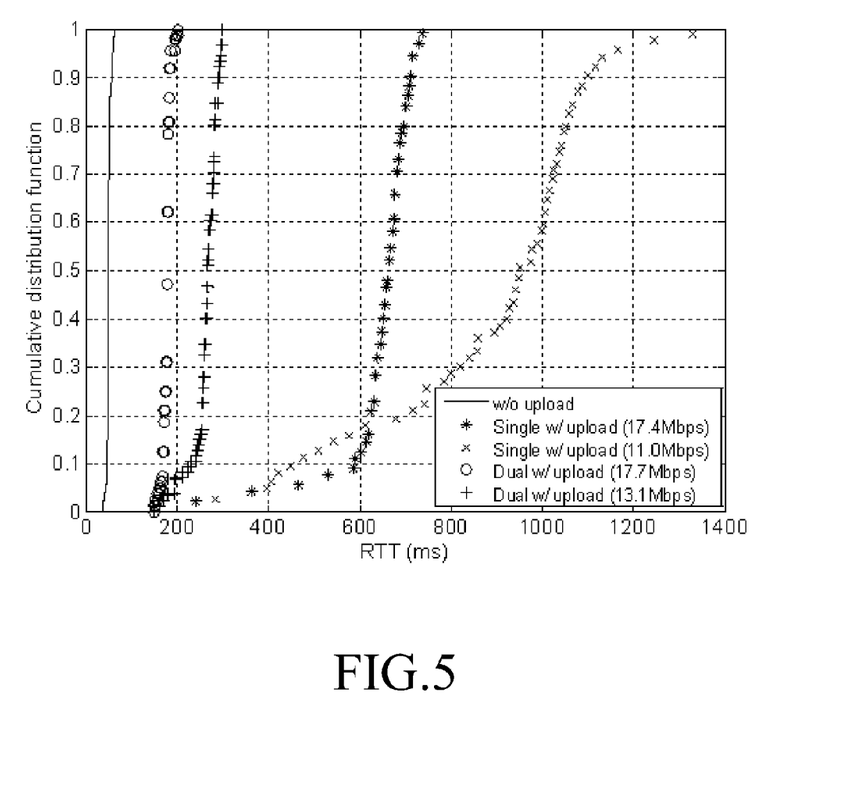
FIG. 5 schematically illustrates delay performance of a mobile messenger in a communication system according to an embodiment of the present disclosure.

FIG. 5 schematically illustrates delay performance of a mobile messenger in a communication system according to an embodiment of the present disclosure. Referring to FIG. 5, in an embodiment of the present disclosure, packets are scheduled based on a QOR of each application, a packet which occurs in a delay-sensitive application, such as an application which targets real time packet transmission and reception such as a mobile messenger is scheduled prior to a packet which occurs in a delay-insensitive application, such as an application which targets file transfer such as a cloud storage service, so QoE of a user may be enhanced.

So, it will be assumed that delay performance of each of a plurality of applications is measured while upload traffic is generated using iperf in an LTE communication system in order to check performance enhancement according to an embodiment of the present disclosure, as illustrated in FIG. 5. Here, delay performance of each of a plurality of applications according to an embodiment of the present disclosure is compared to delay performance in a case that a single-transmission queue architecture is used, and a compared result is illustrated in FIG. 5.

In FIG. 5, it will be noted that delay performance of a mobile messenger is delay performance in a case that KAKAO TALK© is used as the mobile messenger. In FIG. 5, the delay performance in the case that KAKAO TALK© is used as the mobile messenger is described, however, it will be noted that delay performance in a case that other mobile messenger is used is almost similar to the delay performance in the case that KAKAO TALK© is used. That is, KAKAO TALK© is just an example for describing delay performance of a mobile messenger in a communication system according to an embodiment of the present disclosure, it will be noted that enhancement for delay performance of a mobile messenger in a communication system according to an embodiment of the present disclosure is not limited to KAKAO TALK©.

In FIG. 5, it will be noted that round trip time (RTT) of a mobile messenger in a case that a multi-transmission queue architecture is used and a upload bandwidth is 13.1 Mpbs is illustrated as "Dual w/upload(13.1 Mbps)", RTT of a mobile messenger in a case that a multi-transmission queue architecture is used and a upload bandwidth is 17.7 Mpbs is illustrated as "Dual w/upload(17.7 Mbps)", RTT of a mobile messenger in a case that a single-transmission queue architecture is used and a upload bandwidth is 11.0 Mpbs is illustrated as "Single w/upload(11.0 Mbps)", and RTT of a mobile messenger in a case that a single-transmission queue architecture is used and a upload bandwidth is 17.4 Mpbs is illustrated as "Single w/upload(17.4 Mbps)".

In FIG. 5, a vertical axis indicates a cumulative distribution function, and a horizontal axis indicates RTT. As illustrated in FIG. 5, it may be understood that delay performance of a mobile messenger in a case that a multi-transmission queue architecture which is based on a QOR according to an embodiment of the present disclosure is used is better than delay performance of a mobile messenger in a case that a single-transmission queue architecture is used. In FIG. 5, it may be understood that the narrower an uplink bandwidth is, the greater difference is. Here, the difference is difference between delay performance of a mobile messenger in a case that a multi-transmission queue architecture which is based on a QOR according to an embodiment of the present disclosure is used and delay performance of a mobile messenger in a case that a single-transmission queue architecture is used. Delay performance of a mobile messenger in a communication system according to an embodiment of the present disclosure has been described with reference to FIG. 5, and delay performance of a mobile game in a communication system according to an embodiment of the present disclosure will be described with reference to FIG. 6.

Figure 6:
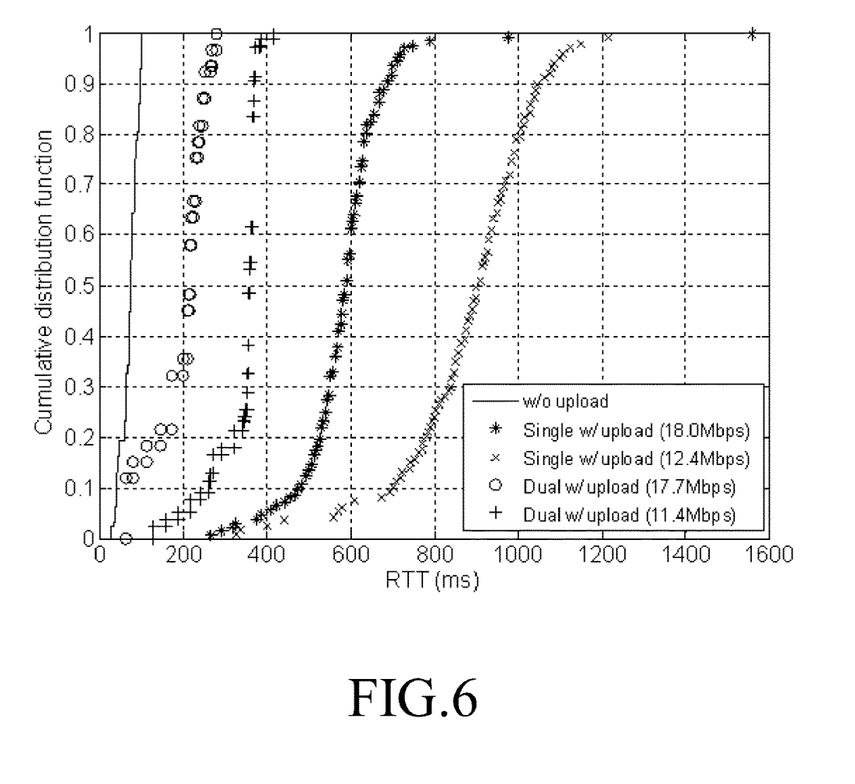
FIG. 6 schematically illustrates delay performance of a mobile game in a communication system according to an embodiment of the present disclosure.

FIG. 6 schematically illustrates delay performance of a mobile game in a communication system according to an embodiment of the present disclosure. Referring to FIG. 6, an embodiment of the present disclosure may enhance QoE of a user by scheduling packets based on a QOR of each application. So, it will be assumed that delay performance of each of a plurality of applications is measured while upload traffic is generated using iperf in an LTE communication system in order to check performance enhancement according to an embodiment of the present disclosure, as illustrated in FIG. 6. Here, delay performance of each of a plurality of applications according to an embodiment of the present disclosure is compared to delay performance in a case that a single-transmission queue architecture is used, and a compared result is illustrated in FIG. 6.

In FIG. 6, it will be noted that delay performance of a mobile game is delay performance in a case that MODOO MARBL© is used as the mobile game. In FIG. 6, the delay performance in the case that MODOO MARBLE© is used as the mobile game is described, however, it will be noted that delay performance in a case that other mobile game is used is almost similar to the delay performance in the case that MODOO MARBLE© is used. That is, MODOO MARBLE© is just an example for describing delay performance of a mobile game in a communication system according to an embodiment of the present disclosure, it will be noted that enhancement for delay performance of a mobile game in a communication system according to an embodiment of the present disclosure is not limited to MODOO MARBLE©.

In FIG. 6, it will be noted that RTT of a mobile game in a case that a multi-transmission queue architecture is used and a upload bandwidth is 11.4 Mpbs is illustrated as "Dual w/upload(11.4 Mbps)", RTT of a mobile game in a case that a multi-transmission queue architecture is used and a upload bandwidth is 17.7 Mpbs is illustrated as "Dual w/upload (17.7 Mbps)", RTT of a mobile game in a case that a single-transmission queue architecture is used and a upload bandwidth is 12.4 Mpbs is illustrated as "Single w/upload (12.4 Mbps)", and RTT of a mobile game in a case that a single-transmission queue architecture is used and a upload bandwidth is 18.0 Mpbs is illustrated as "Single w/upload (18.0 Mbps)".

In FIG. 6, a vertical axis indicates a cumulative distribution function, and a horizontal axis indicates RTT. As illustrated in FIG. 6, it may be understood that delay performance of a mobile game in a case that a multi-transmission queue architecture which is based on a QOR according to an embodiment of the present disclosure is used is better than delay performance of a mobile game in a case that a single-transmission queue architecture is used. In FIG. 6, it may be understood that the narrower a uplink bandwidth is, the greater difference is. Here, the difference is a difference between delay performance of a mobile game in a case that a multi-transmission queue architecture which is based on a QOR according to an embodiment of the present disclosure is used and delay performance of a mobile game in a case that a single-transmission queue architecture is used.

Delay performance of a mobile game in a communication system according to an embodiment of the present disclosure has been described with reference to FIG. 6, and delay performance of a mobile voice over internet protocol (mVoIP) in a communication system according to an embodiment of the present disclosure will be described with reference to FIG. 7.

Figure 7:
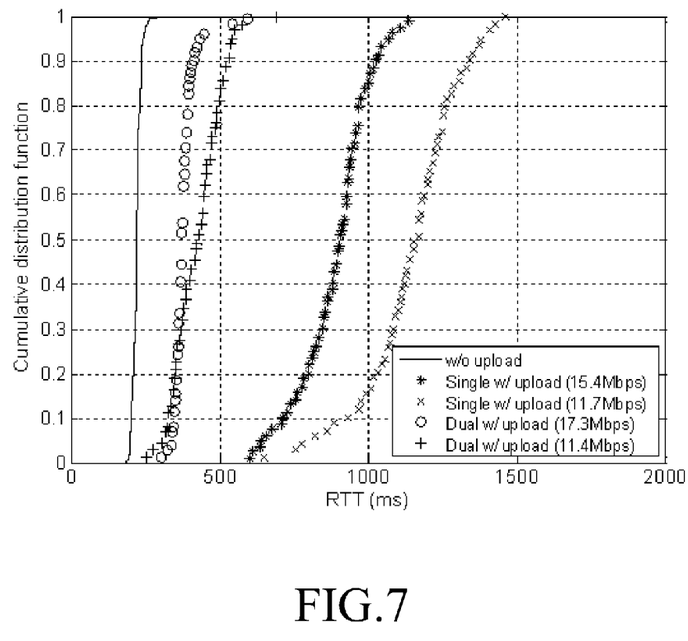
FIG. 7 schematically illustrates delay performance of a mVoIP in a communication system according to an embodiment of the present disclosure.

FIG. 7 schematically illustrates delay performance of a mVoIP in a communication system according to an embodiment of the present disclosure. Referring to FIG. 7, an embodiment of the present disclosure may enhance QoE of a user by scheduling packets based on a QOR of each application.

So, it will be assumed that delay performance of each of a plurality of applications is measured while upload traffic is generated using iperf in an LTE communication system in order to check performance enhancement according to an embodiment of the present disclosure, as illustrated in FIG. 7. Here, delay performance of each of a plurality of applications according to an embodiment of the present disclosure is compared to delay performance in a case that a single-transmission queue architecture is used, and a compared result is illustrated in FIG. 7.

In FIG. 7, it will be noted that delay performance of a mVoIP is delay performance in a case that SKYPE© is used as the mVoIP. In FIG. 7, the delay performance in the case that SKYPE© is used as the mVoIP is described, however, it will be noted that delay performance in a case that other mVoIP is used is almost similar to the delay performance in the case that SKYPE© is used. That is, SKYPE© is just an example for describing delay performance of a mVoIP in a communication system according to an embodiment of the present disclosure, it will be noted that enhancement for delay performance of a mVoIP in a communication system according to an embodiment of the present disclosure is not limited to SKYPE©.

In FIG. 7, it will be noted that RTT of a mVoIP in a case that a multi-transmission queue architecture is used and a upload bandwidth is 11.4 Mpbs is illustrated as "Dual w/upload(11.4 Mbps)", RTT of a mVoIP in a case that a multi-transmission queue architecture is used and an upload bandwidth is 17.3 Mpbs is illustrated as "Dual w/upload (17.3 Mbps)", RTT of a mVoIP in a case that a single-transmission queue architecture is used and a upload bandwidth is 12.4 Mpbs is illustrated as "Single w/upload(12.4 Mbps)", and RTT of a mVoIP in a case that a single-transmission queue architecture is used and a upload bandwidth is 18.0 Mpbs is illustrated as "Single w/upload(18.0 Mbps)".

In FIG. 7, a vertical axis indicates a cumulative distribution function, and a horizontal axis indicates RTT. As illustrated in FIG. 7, it may be understood that delay performance of a mVoIP in a case that a multi-transmission queue architecture which is based on a QOR according to an embodiment of the present disclosure is used is better than delay performance of a mVoIP in a case that a single-transmission queue architecture is used. In FIG. 7, it may be understood that the narrower a uplink bandwidth is, the greater difference is. Here, the difference is a difference between delay performance of an mVoIP in a case that a multi-transmission queue architecture which is based on a QOR according to an embodiment of the present disclosure is used and delay performance of an mVoIP in a case that a single-transmission queue architecture is used.

Delay performance of a mVoIP in a communication system according to an embodiment of the present disclosure has been described with reference to FIG. 7, and another example of an inner structure of a communication node in a communication system according to an embodiment of the present disclosure will be described with reference to FIG. 8.

Figure 8:
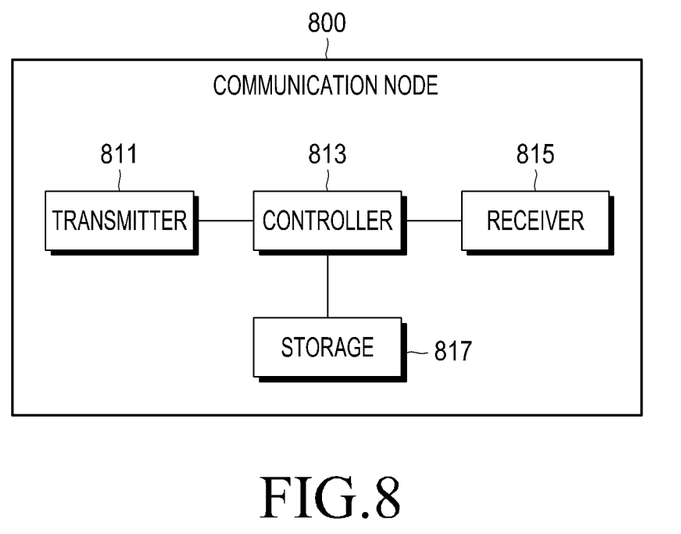
FIG. 8 schematically illustrates another example of an inner structure of a communication node in a communication system according to an embodiment of the present disclosure.

FIG. 8 schematically illustrates another example of an inner structure of a communication node in a communication system according to an embodiment of the present disclosure. Referring to FIG. 8, a communication node 800 includes a transmitter 811, a controller 813, a receiver 815, and a storage unit 817.

The controller 813 controls the overall operation of the communication node 800. More particularly, the controller 813 controls the communication node 800 to perform an operation related to a scheduling operation, such as a scheduling operation based on a QOR according to an embodiment of the present disclosure. The operation related to the scheduling operation based on the QOR according to an embodiment of the present disclosure is performed in the manner described with reference to FIGS. 1 to 7, and a description thereof will be omitted herein.

The transmitter 811 transmits various signals and various messages, and the like to other communication nodes, and the like included in the communication system under a control of the controller 813. The various signals, the various messages, and the like transmitted in the transmitter 811 have been described in FIGS. 1 to 7 and a description thereof will be omitted herein.

The receiver 815 receives various signals, various messages, and the like from other communication nodes included in the communication system under a control of the controller 813. The various signals, the various messages, and the like received in the receiver 815 have been described in FIGS. 1 to 7 and a description thereof will be omitted herein.

The storage unit 817 stores a program related to the operation related to the scheduling operation based on the QOR according to an embodiment of the present disclosure which the communication node 800 performs under a control of the controller 813, various data, and the like. The storage unit 817 stores the various signals and the various messages which the receiver 815 receives from the other communication nodes, and the like.

While the transmitter 811, the controller 813, the receiver 815, and the storage unit 817 are described in the communication node 800 as separate units, it is to be understood that this is merely for convenience of description. In other words, two or more of the transmitter 811, the controller 813, the receiver 815, and the storage unit 817 may be incorporated into a single unit. The communication node 800 may be implemented with one processor. As is apparent from the foregoing description, an embodiment of the present disclosure enables to schedule a packet in a communication system. An embodiment of the present disclosure enables to schedule a packet by considering a delay characteristic in a communication system. An embodiment of the present disclosure enables to schedule a packet by considering a delay characteristic thereby enabling to decrease computing overhead in a communication system. An embodiment of the present disclosure enables to schedule a packet by considering a delay characteristic thereby enabling to decrease delay in a communication system. An embodiment of the present disclosure enables to schedule a packet by considering a delay characteristic thereby enabling to enhance QoE in a communication system.

Certain aspects of the present disclosure may also be embodied as computer readable code on a non-transitory computer readable recording medium. A non-transitory computer readable recording medium is any data storage device that can store data, which can be thereafter read by a computer system. Examples of the non-transitory computer readable recording medium include read only memory (ROM), random access memory (RAM), CD-ROMs, magnetic tapes, floppy disks, optical data storage devices, and carrier waves (such as data transmission through the Internet). The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

It can be appreciated that a method and apparatus according to an embodiment of the present disclosure may be implemented by hardware, software and/or a combination thereof. The software may be stored in a non-volatile storage, for example, an erasable or re-writable ROM, a memory, for example, a RAM, a memory chip, a memory device, or a memory integrated circuit (IC), or an optically or magnetically recordable non-transitory machine-readable (such as computer-readable), storage medium (such as a compact disk (CD), a digital video disc (DVD), a magnetic disk, a magnetic tape, and/or the like). A method and apparatus according to an embodiment of the present disclosure may be implemented by a computer or a mobile terminal that includes a controller and a memory, and the memory may be an example of a non-transitory machine-readable (such as computer-readable), storage medium suitable to store a program or programs including instructions for implementing various embodiments of the present disclosure.

The present disclosure may include a program including code for implementing the apparatus and method as defined by the appended claims, and a non-transitory machine-readable (such as computer-readable), storage medium storing the program. The program may be electronically transferred via any media, such as communication signals, which are transmitted through wired and/or wireless connections, and the present disclosure may include their equivalents.

An apparatus according to an embodiment of the present disclosure may receive the program from a program providing device which is connected to the apparatus via a wire or a wireless and store the program. The program providing device may include a memory for storing instructions which instruct to perform a content protect method which has been already installed, information necessary for the content protect method, and the like, a communication unit for performing a wired or a wireless communication with a graphic processing device, and a controller for transmitting a related program to a transmitting/receiving device based on a request of the graphic processing device or automatically transmitting the related program to the transmitting/receiving device.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for scheduling a packet in a communication node in a communication system, the method comprising:
   detecting a plurality of queue occupancy ratios (QORs) corresponding to a plurality of transmission buffers that are mapped respectively to a plurality of applications on which at least one packet occurs;
   comparing each of the plurality of detected QORs with a corresponding one of a plurality of preset threshold QORs;
   inserting, based on the comparison, at least one first packet into a first transmission queue from at least one first transmission buffer, wherein each QOR of the at least one first transmission buffer is less than or equal to a corresponding preset threshold;
   inserting, based on the comparison, at least one second packet into a second transmission queue from at least one second transmission buffer, wherein each QOR of the at least one second transmission buffer greater than the corresponding preset threshold; and
   transmitting the at least one first packet inserted into the first transmission queue, in advance of the at least one second packet inserted into the second transmission queue,
   wherein the QOR denotes a ratio of a size of at least one packet to a size of a transmission buffer.

2. The method of claim 1, wherein detecting the plurality of QORs comprises:
   detecting the plurality of QORs at a timing point at which the at least one packet occurs, or
   detecting the plurality of QORs at a preset scheduling timing point.

3. A communication node in a communication system, the communication node comprising:

a controller configured to perform:
    an operation of detecting a plurality of queue occupancy ratios (QORs) corresponding to a plurality of transmission buffers that are mapped respectively to a plurality of applications on which at least one packet occurs,
    an operation of comparing each of the plurality of detected QORs with corresponding one of a plurality of preset threshold QORs, and
    an operation of inserting, based on the comparison, at least one first packet into a first transmission queue from at least one first transmission buffer, wherein each QOR of the at least one first transmission buffer is less than or equal to a corresponding preset threshold,
    an operation of inserting, based on the comparison, at least one second packet into a second transmission queue from at least one second transmission buffer, wherein each QOR of the at least one second transmission buffer greater than the corresponding preset threshold; and
a transmitter configured to transmit the at least one first packet inserted into the first transmission queue, in advance of the at least one second packet inserted into the second transmission queue,
wherein the QOR denotes a ratio of a size of at least one packet to a size of a transmission buffer.

4. The communication node of claim 3, wherein the operation of detecting the QORs comprises:
    an operation of detecting the plurality of QORs at a timing point at which the at least one packet occurs, or
    an operation of detecting the plurality of QORs at a preset scheduling timing point.

* * * * *